US012725510B2

(12) United States Patent
Raucher et al.

(10) Patent No.: US 12,725,510 B2
(45) **Date of Patent: *Sep. 1, 2026**

(54) ENHANCED SITUATIONAL AWARENESS FOR EMERGENCY RESPONSE

(71) Applicant: RapidDeploy, Inc., Austin, TX (US)

(72) Inventors: Steven Raucher, Austin, TX (US); Brett Meyerowitz, Cape Town (ZA); Brooks Thomas Shannon, Austin, TX (US)

(73) Assignee: RAPIDDEPLOY, INC., Austin, TX (US)

( * ) Notice: Subject to any disclaimer, the term of this patent is extended or adjusted under 35 U.S.C. 154(b) by 77 days.

This patent is subject to a terminal disclaimer.

(21) Appl. No.: 18/780,140

(22) Filed: Jul. 22, 2024

(65) Prior Publication Data

US 2024/0378987 A1 Nov. 14, 2024

Related U.S. Application Data

(63) Continuation of application No. 18/072,410, filed on Nov. 30, 2022, now Pat. No. 12,046,123, which is a continuation of application No. 17/699,233, filed on Mar. 21, 2022, now Pat. No. 11,538,332.

(60) Provisional application No. 63/168,678, filed on Mar. 31, 2021.

(51) Int. Cl.

| | |
|---|---|
| ***G08B 26/00*** | (2006.01) |
| ***G08B 25/10*** | (2006.01) |
| ***H04H 20/59*** | (2008.01) |
| ***H04W 4/90*** | (2018.01) |

(52) U.S. Cl.

CPC .......... *G08B 26/008* (2013.01); *G08B 25/10* (2013.01); *G08B 26/007* (2013.01); *H04H 20/59* (2013.01); *H04W 4/90* (2018.02)

(58) Field of Classification Search

CPC .... G08B 26/008; G08B 25/10; G08B 26/007; G08B 25/016; G08B 25/14; H04H 20/59; H04W 4/90

USPC .......................................................... 340/518

See application file for complete search history.

(56) References Cited

U.S. PATENT DOCUMENTS 9,852,599 B1 * 12/2017 Slavin ...................... A61B 7/04
10,796,582 B1 * 10/2020 Rodriguez Bravo . H04W 4/022
2011/0087510 A1 * 4/2011 Putra ............. G06Q 10/063112 709/204

(Continued)

FOREIGN PATENT DOCUMENTS

WO 2021007588 A1 1/2021

*Primary Examiner* — Tai T Nguyen

(57) ABSTRACT

An emergency system can access a variety of situational data items, such as video streams, facility information, and present and past incident data. The emergency system identifies data items that may be relevant to a particular incident and provides the relevant data items in one or more user interfaces. For example, the emergency system identifies relevant data items based on the reported location of the incident and the type of incident. As additional incident information is received or entered by telecommunicators, the emergency system can further filter and surface data items likely to be useful in responding to the incident. Certain data items may only be permitted to be viewed by certain types of users, or under certain conditions. The emergency system may ensure that data items are provided to authorized users and in permitted use cases.

20 Claims, 7 Drawing Sheets

(56) References Cited

U.S. PATENT DOCUMENTS

| | | | | |
|---|---|---|---|---|
| 2017/0153790 | A1 | 6/2017 | Mohanam et al. | |
| 2018/0053401 | A1* | 2/2018 | Martin | H04M 11/04 |
| 2018/0174430 | A1* | 6/2018 | Sieja | G08B 21/0453 |
| 2019/0166480 | A1 | 5/2019 | Rauner | |
| 2019/0222993 | A1* | 7/2019 | Maheshwari | G08B 21/0272 |
| 2019/0253861 | A1* | 8/2019 | Horelik | H04W 64/006 |
| 2021/0037368 | A1 | 2/2021 | Pellegrini et al. | |

* cited by examiner

| Data Item Type | Location | Incident Type(s) | Permissions |
|---|---|---|---|
| Municipal Street Camera | Coordinates: (30.26924, -97.741157)<br>Field of view: fixed, 30°-120° | Any | None |
| Home Security Camera | 123 Main Street<br>Field of view: 360° | Fire, Police | • Responders only<br>• In-home events only |
| Doorbell Camera | 123 Main Street | Fire, Police | In-home or neighborhood events |
| Police Dashcam | Mobile (current location provided by dashcam/car) | Fire, Police, EMS | Responders only |
| Police Bodycam | Mobile (current location provided by bodycam/other worn device) | Police | • During active response<br>• Specific police personnel |
| Criminal History of Resident | 234 Water Street | Police | Police responders |
| Prior Electrical Fire | 345 First Street | Fire, EMS | Telecommunicator, responders |
| Pre-plan | 456 Second Street | Fire | Fire responders |
| Keybox locations | Terrace Heights community | Any | Telecommunicator, responders |
| Fire Hydrant | Corner of Avenue A and Main Street | Fire | None |

FIG. 4

ENHANCED SITUATIONAL AWARENESS FOR EMERGENCY RESPONSE

CROSS REFERENCE TO RELATED APPLICATIONS

This application is a continuation of U.S. application Ser. No. 18/072,410, filed Nov. 30, 2022, issued as U.S. Pat. No. 12,046,123 on Jul. 23, 2024, which is a continuation of U.S. application Ser. No. 17/699,233, filed Mar. 21, 2022, issued as U.S. Pat. No. 11,538,332 on Dec. 27, 2022, and claims the benefit of and priority to U.S. Provisional Application No. 63/168,678, filed Mar. 31, 2021, the disclosure of each of which is hereby incorporated by reference herein in their entirety for all purposes.

BACKGROUND

Existing emergency response software provides user interfaces to 9-1-1 telecommunicators and first responders to assist in emergency response. Emergency response software may access data from multiple sources, including call handling systems, cellular providers, and security systems. Such data can offer enhanced situational awareness to 9-1-1 telecommunicators who determine emergency response plans and to first responders who respond to emergencies.

The amount of available digital data is ever-increasing, e.g., as environmental and facility data is digitized, as more cameras and security systems are installed, etc. While additional data has the potential to be helpful in emergency response, an excess of data can become overwhelming to telecommunicators and first responders. If all available data is provided to these users, it can be challenging for them to identify which data is useful in a given emergency incident.

BRIEF DESCRIPTION OF THE DRAWINGS

FIG. 4 illustrates example emergency data items that may be stored in the emergency data item directory, according to some embodiments of the present disclosure;

DESCRIPTION OF EXAMPLE EMBODIMENTS OF THE DISCLOSURE

Overview

Figure 1:
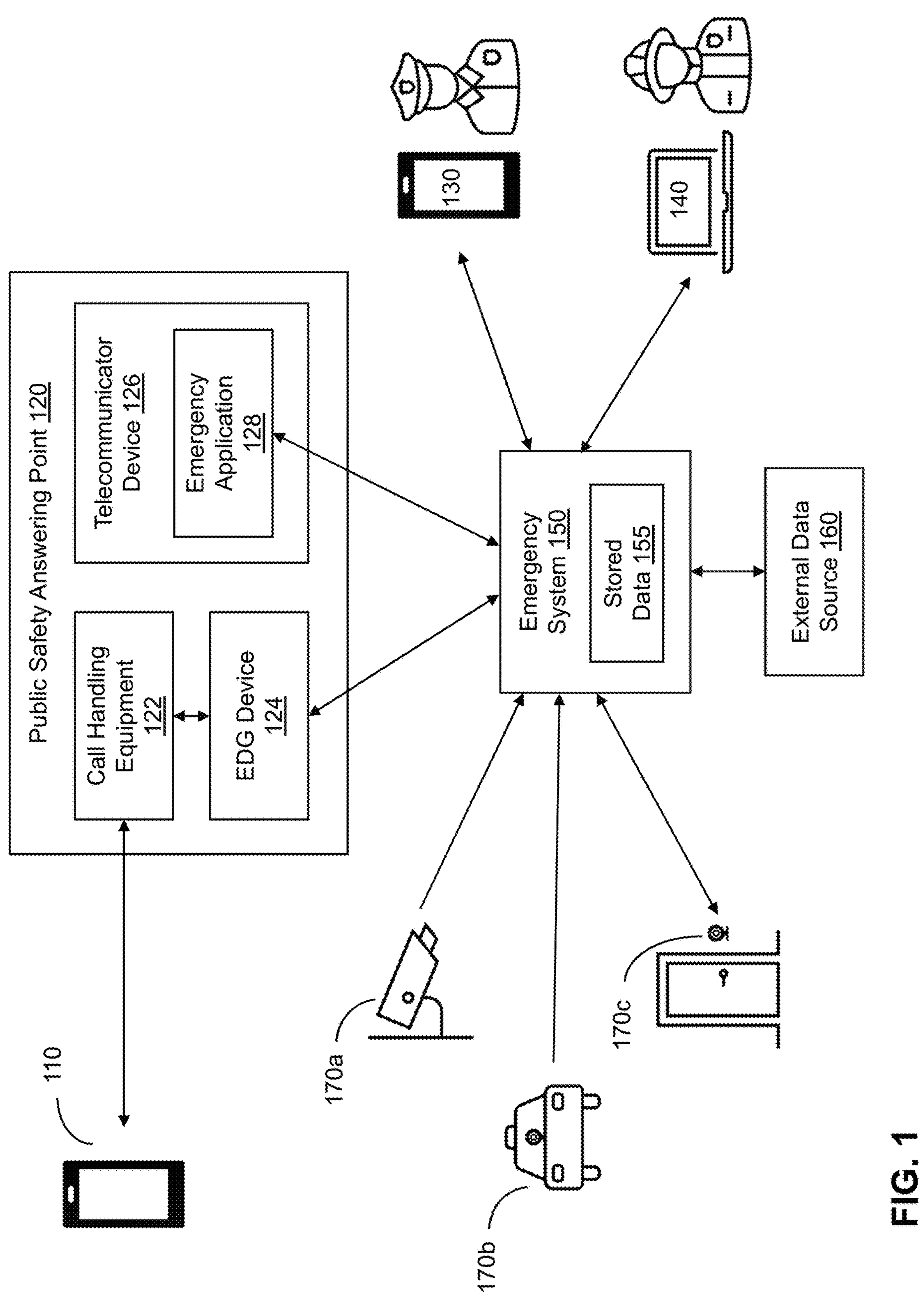
FIG. 1 is a system diagram illustrating an environment of a system for retrieving and displaying data relevant to emergency response, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

The systems described herein provide user interfaces to telecommunicators and first responders to assist these users in responding to incidents. For example, an emergency software system can access data and video from various internal and external data sources. The data and video can offer enhanced situational awareness to 9-1-1 telecommunicators who determine emergency response plans and to first responders who respond to emergencies. As noted above, the amount of available digital data is ever-increasing. For example, environmental and facility data is increasingly being digitized, and more cameras and security systems are being installed and coming online. While this digital data has the potential to be helpful in emergency response, too much data is overwhelming to users. If all available data is provided to telecommunicators or responders, it can be challenging for such users to identify which data is useful in a given emergency incident.

As described herein, an emergency system can access a variety of situational data items, such as video streams, facility information, and present and past incident data. The emergency system identifies data items that may be relevant to a particular incident and provides the relevant data items in one or more user interfaces. For example, the emergency system identifies relevant data items based on the reported location of the incident and the type of incident. As additional incident information is received or entered by telecommunicators, the emergency system can further filter and surface data items likely to be useful in responding to the incident. In some embodiments, certain data items may only be permitted to be viewed by certain types of users, or if certain conditions are met. The emergency system may ensure that data items are provided to authorized users and in permitted use cases.

In some embodiments, the data items accessed by the emergency system include video streams. The emergency system may receive or access video streams from various sources, including video surveillance systems, traffic cameras, CCTV, private security systems, dashcams, bodycams, and smartphones. The emergency system may automatically identify video streams that may be useful by comparing locations of the cameras and/or locations within the cameras' fields of view to the reported location of the incident. In some embodiments, the emergency system utilizes additional image analysis, including using artificial intelligence processes, to identify relevant videos.

The emergency system provides a user interface that displays the relevant data items, such as a computer-aided dispatch (CAD) interface or an emergency call mapping interface. For example, the emergency system generates a map that shows the location of an incident (e.g., a real-time caller location), and symbols associated with one or more relevant data items at their respective locations on the map. The user interface provided by the emergency system may visually distinguish different types of data items, e.g., using different icons for cameras (indicating an available video stream), fire hydrants (indicating the location of a fire hydrant), prior incident data (indicating availability data related to a prior emergency at a location of the emergency), etc. At least some of the icons representing data items may be selectable, and the user interface may display additional data in response to a user's selection of a particular icon. For example, if a user selects a camera icon, the user interface may display a real-time video stream from the camera associated with the selected icon and/or metadata describing the camera feed.

While the systems and methods described herein are described primarily in terms of emergency response, it should be understood that the systems and methods may be used in non-emergency situations, including other types of incident response. For example, the systems and methods described herein may be used to provide relevant situational data to users who respond to mental health incidents, medical or safety incidents at large events, non-emergency police matters, etc. Furthermore, the systems and methods described herein may be used outside of a government agency, e.g., by private safety or security providers, corporate security services, hospital systems, etc., in responding to emergency or non-emergency incidents.

In one aspect, a system for providing situational data for incident response includes a data item directory, processing circuitry, and a user interface. The data item directory describes data items, and a data item in the data item directory is associated with a first location and a first incident type. The processing circuitry is configured to receive data describing a second location, wherein the second location is a location of an incident, receive data describing a second incident type, wherein the second incident type is a type of the incident, and determine that the second location of the incident matches the first location of the data item and that the second incident type of the incident matches the first incident type of the data item. The user interface server is to display the data item in a user interface provided to a user assisting in a response to the incident.

In another aspect, a method for providing situational data for incident response includes receiving data describing a location of an incident; receiving data describing a type of the incident; comparing the location of the incident and the type of the incident to a data item directory describing data items, wherein at least a portion of the data items are associated with a respective location and a respective type of incident; identifying a data item relevant to the incident based on the data item being associated with the location of the incident, and the data item being associated with the type of the incident; and displaying the identified data item in a user interface provided to a user assisting in a response to the incident.

As will be appreciated by one skilled in the art, aspects of the present disclosure, in particular aspects of identifying and displaying data items relevant to emergencies, described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, circuit designs, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems or be stored upon manufacturing of these devices and systems.

In the following detailed description, various aspects of the illustrative implementations may be described using terms commonly employed by those skilled in the art to convey the substance of their work to others skilled in the art. For example, the term "connected" means a direct electrical or magnetic connection between the things that are connected, without any intermediary devices, while the term "coupled" means either a direct electrical or magnetic connection between the things that are connected, or an indirect connection through one or more passive or active intermediary devices. The term "circuit" means one or more passive and/or active components that are arranged to cooperate with one another to provide a desired function. The terms "substantially," "close," "approximately," "near," and "about," generally refer to being within +/−20%, preferably within +/−10%, of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C).

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, reference is made to the accompanying drawings that form a part hereof, showing, by way of illustration, some of the embodiments that may be practiced. In the drawings, same reference numerals refer to the same or analogous elements/materials so that, unless stated otherwise, explanations of an element/material with a given reference numeral provided in context of one of the drawings are applicable to other drawings where elements/materials with the same reference numerals may be illustrated. For convenience, if a collection of drawings designated with different letters are present, e.g., FIGS. 2A-2C, such a collection may be referred to herein without the letters, e.g., as "FIG. 2." The accompanying drawings are not necessarily drawn to scale. Moreover, it will be understood that certain embodiments can include more elements than illustrated in a drawing, certain embodiments can include a subset of the elements illustrated in a drawing, and certain embodiments can incorporate any suitable combination of features from two or more drawings.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

In some examples provided herein, interaction may be described in terms of two, three, four, or more components. However, this has been done for purposes of clarity and example only. It should be appreciated that the devices and systems described herein can be consolidated in any suitable manner. Along similar design alternatives, any of the illustrated components, modules, and elements of the accompanying drawings may be combined in various possible configurations, all of which are clearly within the broad scope of the present disclosure. In certain cases, it may be easier to describe one or more of the functionalities of a given set of flows by only referencing a limited number of electrical elements.

The following detailed description presents various descriptions of specific certain embodiments. However, is to be understood that other embodiments may be utilized, and structural or logical changes may be made without departing from the scope of the present disclosure. In general, the innovations described herein can be embodied in a multitude of different ways, for example, as defined and covered by the claims and/or select examples, and the following detailed description is not to be taken in a limiting sense.

Example Emergency Data Environment

FIG. 1 is a system diagram illustrating an environment of a system for retrieving and displaying data relevant to emergency response, according to some embodiments of the present disclosure. The system includes a mobile device 110, a public safety answering point (PSAP) 120, responder devices 130 and 140, an emergency system 150, an external data source 160, and cameras 170*a*-170*c*. Only one of the mobile device 110, PSAP 120, and external data source 160 are shown for simplicity; it should be understood that in an actual system environment, there may be more of each of these elements. Similarly, there may be more responder devices 130 and/or 140, and more cameras 170, in an actual system environment.

The mobile device 110 may be a cell phone, a smart phone, a tablet, or another device capable of initiating emergency reporting. The mobile device 110 is a device having a user interface (e.g., a touchscreen, buttons, microphone, speaker, camera, etc.) for interacting with a user and wireless communications circuitry that connects the mobile device 110 to a mobile network to initiate an emergency communication, e.g., to place an emergency call or send a text message. The mobile device 110 may connect to a cellular network via a cell tower. A cell tower is one component of a cellular network that enables wireless communication between mobile devices, and enables communication between wireless devices (e.g., the mobile device 110) and other networked communications devices or systems (e.g., the PSAP 120). In other examples, the mobile device 110 may additionally or alternatively connect to an Internet-based network via a wired or wireless connection (e.g., Wi-Fi), or to one or more other types of networks.

When a user of the mobile device 110 makes an emergency call, such as a 9-1-1 call, a network element may interact with a call routing service. The call routing service routes the emergency call from the mobile device 110 to a particular PSAP 120, e.g., based on a location estimate of the mobile device 110. The PSAP 120 may cover a particular geographic region, e.g., a city, a county, a group of counties, a highway system, a park system, etc. The call routing service identifies a PSAP (e.g., PSAP 120) for handling the emergency call, and the mobile device 110 communicates with telephony equipment in the selected PSAP 120, e.g., via a cellular network or other networking equipment. While a mobile device 110 is illustrated in FIG. 1, other calling devices, such as land-line telephones or IP-based stationary telephones, may make emergency calls received at the PSAP 120.

The PSAP 120 is an emergency call handling system. The PSAP 120 includes call handling equipment (CHE) 122, an emergency data gateway (EDG) device 124, and a telecommunicator device 126 executing an emergency application 128. The CHE 122 receives and handles calls from the telephony network. The CHE 122 creates a call event for each received call, such as an emergency call from mobile device 110. The CHE 122 associates call data, such as caller location information, call routing actions, Automatic Call Distribution (ACD) events, and other telemetry data, with the call event. Call data may also include the phone number and contact name of the user of the mobile device 110, class of service, mobile service provider, a time stamp, and other information describing the user, mobile device 110, network, etc. The CHE 122 may output call data in one of a variety of data output formats, such as Automatic Location Information (ALI), Call Detail Record (CDR), or National Emergency Number Association (NENA) i3 Logging.

In the example shown in FIG. 1, an EDG device 124 installed at the PSAP 120 connects to the CHE 122. The EDG device 124 receives the call data from the CHE 122 and parses and formats the call data into a consistent data format. The EDG device 124 connects to an emergency system 150 via a network, such as the Internet, and the EDG device 124 transmits the formatted call data to the emergency system 150 via the network. The use of an EDG device 124 to transfer data from a CHE 122 to a cloud-based emergency system 150 is described in U.S. Pat. No. 10,264,122, incorporated by reference in its entirety. In another example, a central Customer Premises Equipment (CPE) host located outside the PSAP 120 receives call information for a group of PSAPs and distributes the call information to a selected PSAP, e.g., PSAP 120. In this example, a multi-tenant emergency call data relay may capture call data from the central CPE host and transmit the captured call data to the emergency system 150. The use of the data relay, and the data relay in combination with one or more EDG devices, is described in U.S. patent application Ser. No. 17/070,400, incorporated by reference in its entirety.

The PSAP 120 further includes a telecommunicator device 126. In this example, the telecommunicator device 126 is a computer system operated by a telecommunicator on-site at the PSAP 120. In other embodiments, the telecommunicator device 126 is at a different location from the PSAP 120, e.g., at a backup facility, mobile command center, remote worksite, etc. The telecommunicator device 126 includes the hardware and software needed to display user interfaces, connect to an IP-based network, and detect user input. The telecommunicator device 126 includes an emergency application 128 that allows interaction with the emergency system 150. In one embodiment, the emergency application 128 is a browser that allows a telecommunicator to access a web-based software service provided by the emergency system 150. In another embodiment, the emergency application 128 is a dedicated application provided by the emergency system 150 to enable interactions with the emergency system 150. The PSAP 120 may include multiple telecommunicator devices 126, each used by a different telecommunicator. Each telecommunicator device may have an associated position number.

The emergency system 150 assists telecommunicators in responding to emergency calls. The emergency system 150 may be a cloud-based processing system embodied on one or more remote servers. While the emergency system 150 is shown as being outside the PSAP 120, in other embodiments, some or all of the functions performed by the emergency system 150 and described herein may alternatively be performed by on-site hardware located within a PSAP 120. In some embodiments, the emergency system 150 additionally or alternatively assists first responders (e.g., firefighters, police officers, and emergency medical services (EMS) providers) in responding to emergency calls. The emergency system 150 may provide an emergency application (e.g., a web-based application or installed application) to responder devices, such as the responder devices 130 and 140. In the depiction shown in FIG. 1, the responder device 130 is a mobile device used by a police officer, and the responder device 140 is a laptop computer used by a fire responder.

The emergency system 150 may provide one or more different types of software services. For example, the emergency system 150 may be a cloud-native CAD system that manages a CAD service. The CAD service provides information about emergency calls and first responders to telecommunicators, and it enables telecommunicators to connect to first responders and dispatch first responders to the locations of emergency incidents. In another example, the emergency system 150 provides an emergency call mapping interface that provides data about emergencies in a region (e.g., the jurisdiction of the PSAP 120) on a real-time map. The emergency system 150 may provide different user interfaces (UIs) for different users and different types of users, e.g., a call-taker interface used by a 9-1-1 call-taker, a dispatcher interface used by an emergency response dispatcher, a mobile responder interface used by a first responder (e.g., a firefighter, a police officer, or a paramedic). The interfaces may be web-based interfaces accessed through a browser, or the emergency system 150 may provide an application (e.g., a Microsoft Windows application) or mobile app (e.g., an app for iOS or Android).

The emergency system 150 may receive the formatted call data generated by the EDG device 124, process the received formatted call data, and generate user interfaces for display by the emergency application 148 and/or by applications on the responder devices 130 and/or 140. The emergency system 150 also receives or accesses additional data from one or more additional data sources. These data sources include stored data 155 stored by the emergency system 150, data received from one or more external data sources 160, and video streams received from cameras 170*a*-170*c* (referred to jointly as cameras 170). The emergency system 150 identifies relevant data items from any of these data sources 155, 160, and 170 and includes the relevant data items, or information describing the relevant data items, in user interfaces provided to the emergency application 148 and/or by applications on the responder devices 130 and/or 140, as described in detail below.

Example Emergency System

Figure 2:
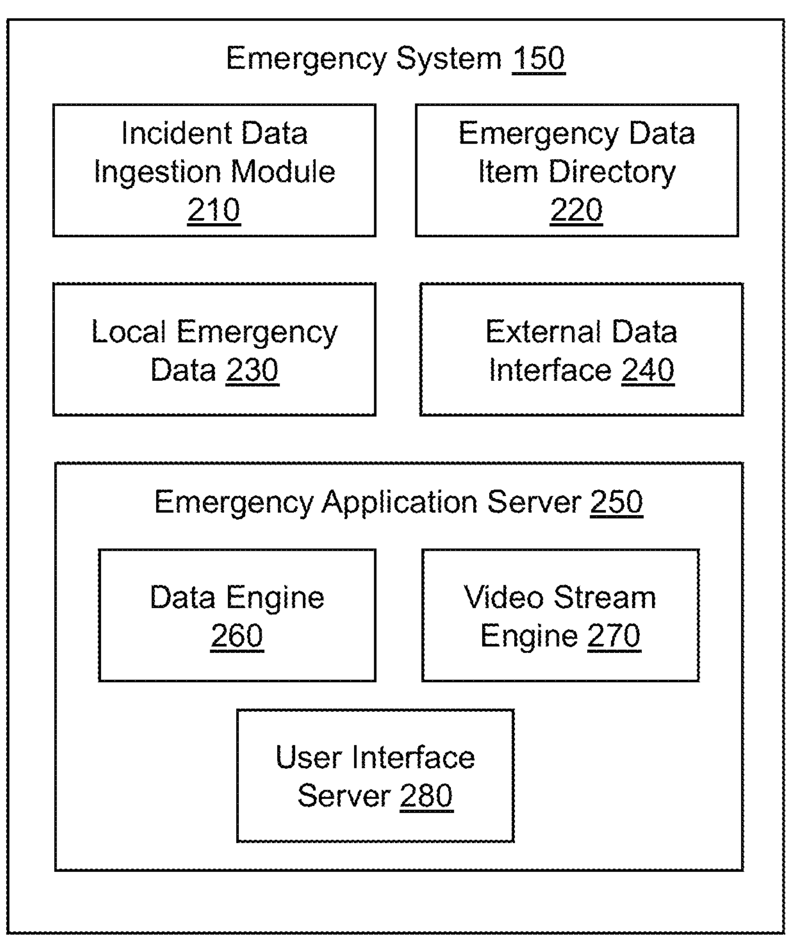
FIG. 2 is a block diagram of the emergency system, according to some embodiments of the present disclosure.

FIG. 2 is a block diagram of the emergency system 150 according to some embodiments of the present disclosure. The emergency system 150 includes an incident data ingestion module 210, an emergency data item directory 220, a local emergency data 230, an external data interface 240, and an emergency application server 250 that includes a data engine 260, a video stream engine 270, and a user interface server 280. In alternative configurations, different and/or additional components may be included in the emergency system 150. Additionally, functionality described in conjunction with one or more of the components shown in FIG. 2 may be distributed among the components in a different manner than described in conjunction with FIG. 2 in some embodiments.

The incident data ingestion module 210 receives and processes incident data related to emergency calls received at PSAPs. Such incident data may include call data received by the EDG device 124 within the PSAP 120 and transmitted to the emergency system 150. The call data may include caller information, such as phone number, location, time, cellular provider, etc. The incident data ingestion module 210 may receive and process call data from other sources, such as one or more multi-tenant emergency call data relays, which may be used in combination with one or more EDG devices. The incident data ingestion module 210 may receive incident data entered by a telecommunicator, e.g., data describing a type of response requested (e.g., fire, police, or medical), data describing a more specific type of incident (e.g., physical injury, unconscious person, sick person, structure fire, electrical fire, car crash, etc.), location data, data describing other parties involved in the incident, etc. The incident data ingestion module 210 may further receive data from one or more supplemental data sources, e.g., supplemental location providers, home security systems, etc.

The incident data ingestion module 210 may determine whether received incident data relates to a new call or incident or to an existing call or incident, and associates incident data related to the same incident. The incident data ingestion module 210 outputs incident data to the local emergency data 230. In some embodiments, the incident data ingestion module 210 also outputs call data to one or more processing modules, such as the data engine 260. In some embodiments, the emergency system 150 includes multiple data ingestion modules, e.g., a call data ingestion module connected to EDG devices, an emergency application data ingestion module that receives incident data entered by a user of the emergency application (e.g., a telecommunicator), and one or more supplemental data modules that receive data from supplemental data sources.

The emergency data item directory 220 stores data describing emergency data items. As used herein, an emergency data item can include any data that may be used in planning a response to an emergency or responding to the emergency. Emergency data items may include real-time data, such as real-time video streams or real-time locations, or stored data, such as past incident data or saved video clips. The emergency system 150 may access emergency data items from various sources, including external data sources (e.g., cameras located on-site at an emergency incident, or third-party data providers) and internal sources (e.g., data stored by the emergency system 150, e.g., from prior incidents handled by the emergency system 150). Various examples of emergency data items are shown in FIG. 4, described below. As noted above, while an emergency response use case is primarily described herein, the emergency system 150, or a system similar to the emergency system 150, may be used in non-emergency use cases, or in both emergency and non-emergency use cases. The emergency data item directory 220 or a similar data item directory (e.g., more generically, an incident data item directory) stores data describing data items (which may be referred to as incident data items) that may be used in planning a response to a non-emergency incident or responding to the non-emergency incident.

The emergency data item directory 220 stores information describing emergency data items, which may also be referred to as metadata of the emergency data items. For example, if an emergency data item is a video from a particular video camera, the emergency data item directory 220 stores information describing the video, such as a location of the camera, a field of view of the camera, information for accessing the video (e.g., a web link). The emergency data item directory 220 may further store information describing access restrictions on a data item, such as types of users who may view the video and/or view data describing the video, or types of incidents for which the users may access the video. In some embodiments, the emergency data item directory 220 stores at least some of the data items as well as the metadata. In other embodiments, the emergency data item directory 220 stores information for accessing the data items, but does not store the data items themselves. The emergency data item directory 220 may take any form for storing data, e.g., any form of database or other data store.

The local emergency data 230 stores local emergency data items, i.e., emergency data items that are stored by the emergency system 150. Metadata describing the local emergency data 230 is included in the emergency data item directory 220. For example, the emergency system 150 may store information related to prior emergency incidents (e.g., location information, caller information, incident type, incident details, time opened, time closed, responder information, etc.) handled by the emergency system 150 in the local emergency data 230. As another example, the local emergency data 230 may include information provided to the emergency system 150 by users. For example, a fire department that relies on software provided by the emergency system 150 may provide data useful in fire responses to the emergency system 150 for storage in the local emergency data 230. Such data may include keybox locations (locations of keys that first responders can use to access buildings or gated communities), building pre-plans (data describing building layouts, access information, materials, hazards, etc.), locations of fire hydrants, etc. The emergency system 150 may store any other data provided to the emergency system 150 in the local emergency data 230.

The local emergency data 230 may be stored on any device controlled by the emergency system 150, e.g., if the emergency system 150 is a cloud-based system, the local emergency data 230 are stored on a device in the cloud. The local emergency data 230 may be encrypted. The local emergency data 230 may include one or more of a Binary Large OBject (BLOB) storage service, data warehouse, key-value database, document database, relational database, or any other type of data storage. The local emergency data 230 may include multiple databases for storing different types of information and/or for storing information related to different PSAPs or agencies. In some embodiments, some or all of the local emergency data 230 is included in the emergency data item directory 220.

The external data interface 240 provides an interface to one or more external data sources that can be accessed by the emergency system 150. Metadata describing the external data, including information for accessing the external data, is included in the emergency data item directory 220. The emergency system 150 may include multiple external data interfaces for accessing different data sources, e.g., a first interface for accessing a criminal justice information system (CJIS) database, a second interface for accessing video streams from police bodycams, a third interface for accessing video streams from security cameras provided by a particular commercial security company, etc.

In some embodiments, the external data interface 240 may search external data sources for data items that are not included in the emergency data item directory 220. For example, a commercial security system provider may not provide a list of all on-line cameras to the emergency system 150 for inclusion in the emergency data item directory 220. Instead, the external data interface 240 may transmit a request to an external data provider for data related to a particular incident, e.g., cameras at a particular address, or cameras within a given radius of a particular latitude and longitude.

The emergency application server 250 generates and provides user interfaces to users providing emergency response assistance, including telecommunicators and/or first responders. In this example, the emergency application server 250 includes a data engine 260, a video stream engine 270, and a user interface server 280. In some configurations, different and/or additional components may be included in the emergency application server 250, e.g., for enabling additional user interface features not specifically described herein.

The data engine 260 identifies emergency data items for a particular incident. When the incident data ingestion module 210 receives incident data related to an emergency call received at the PSAP, the data engine 260 compares the incident data to the emergency data item directory 220 to identify one or more emergency data items related to the incident. For example, the incident data ingestion module 210 receives a location of an incident (e.g., a location of an emergency caller, or a location reported by the emergency caller and entered by a telecommunicator into a call taking interface provided by the user interface server 280) and a type of incident (e.g., an incident type entered by a telecommunicator). The data engine 260 compares the location of the incident and the type of incident to the metadata describing emergency items in the emergency data item directory 220 to identify data items. As noted above, in some embodiments, the emergency data item directory 220 may not store data describing certain data items (e.g., if an external data source does not provide metadata describing its data items to the emergency system 150), and the data engine 260 may transmit incident data to the external data interface 240, which requests relevant data items from one or more external data sources. The data engine 260 retrieves the identified data items, e.g., from the local emergency data 230, or from external data sources via the external data interface 240. If a data item has permissions or access restrictions, the data engine 260 may also check the permissions or access restrictions to ensure that it accesses and provides permitted data, e.g., data items permitted to be viewed by a certain user, or data items permitted to be viewed in a certain incident type. The data engine 260 provides the data items to the user interface server 280 for display to a user.

As the data engine 260 receives additional incident data, e.g., additional locations or more details describing the incident, the data engine 260 may search the emergency data item directory 220 for additional emergency data items. In addition, as the data engine 260 receives requests from the user interface for more data (e.g., if a user requests to view a camera stream, or to view additional data about a certain data item), the data engine 260 may receive the request and retrieve the data from the local emergency data 230 and/or the external data interface 240.

If the data items include one or more video streams, the data engine 260 may pass the video streams, or data for accessing the video streams, to the video stream engine 270 for further processing. For example, the video stream engine 270 may ingest real-time or stored videos, identify relevant videos based on their contents (e.g., using automated image analysis), and format any identified relevant videos for transmission to a user. The video stream engine 270 may provide a formatted video to the user interface server 280 for transmission and display to a user. The video stream engine 270 is described further in relation to FIG. 3.

Figure 5:
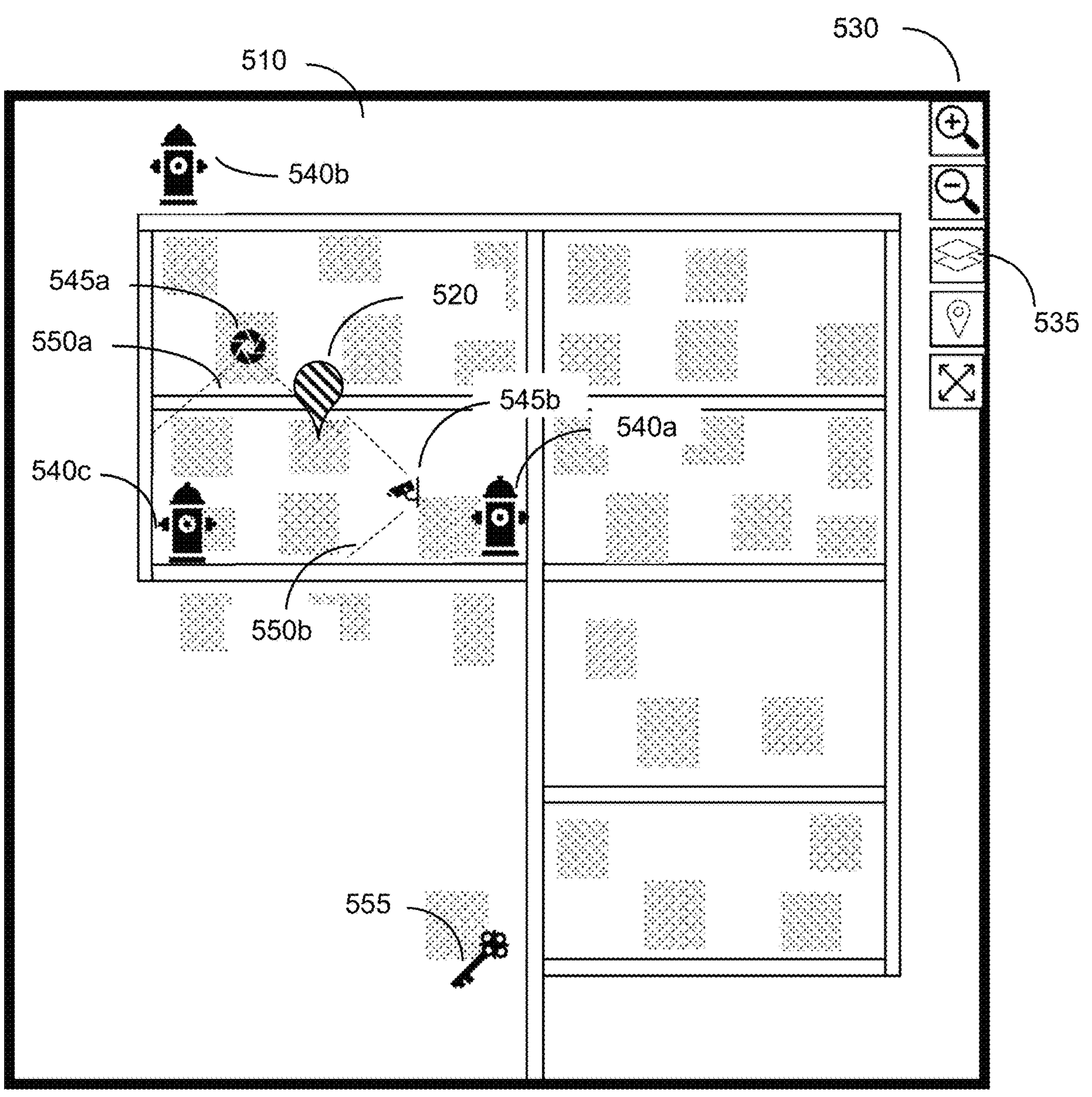
FIG. 5 is an example user interface that displays relevant emergency data items, according to some embodiments of the present disclosure.
Figure 6:
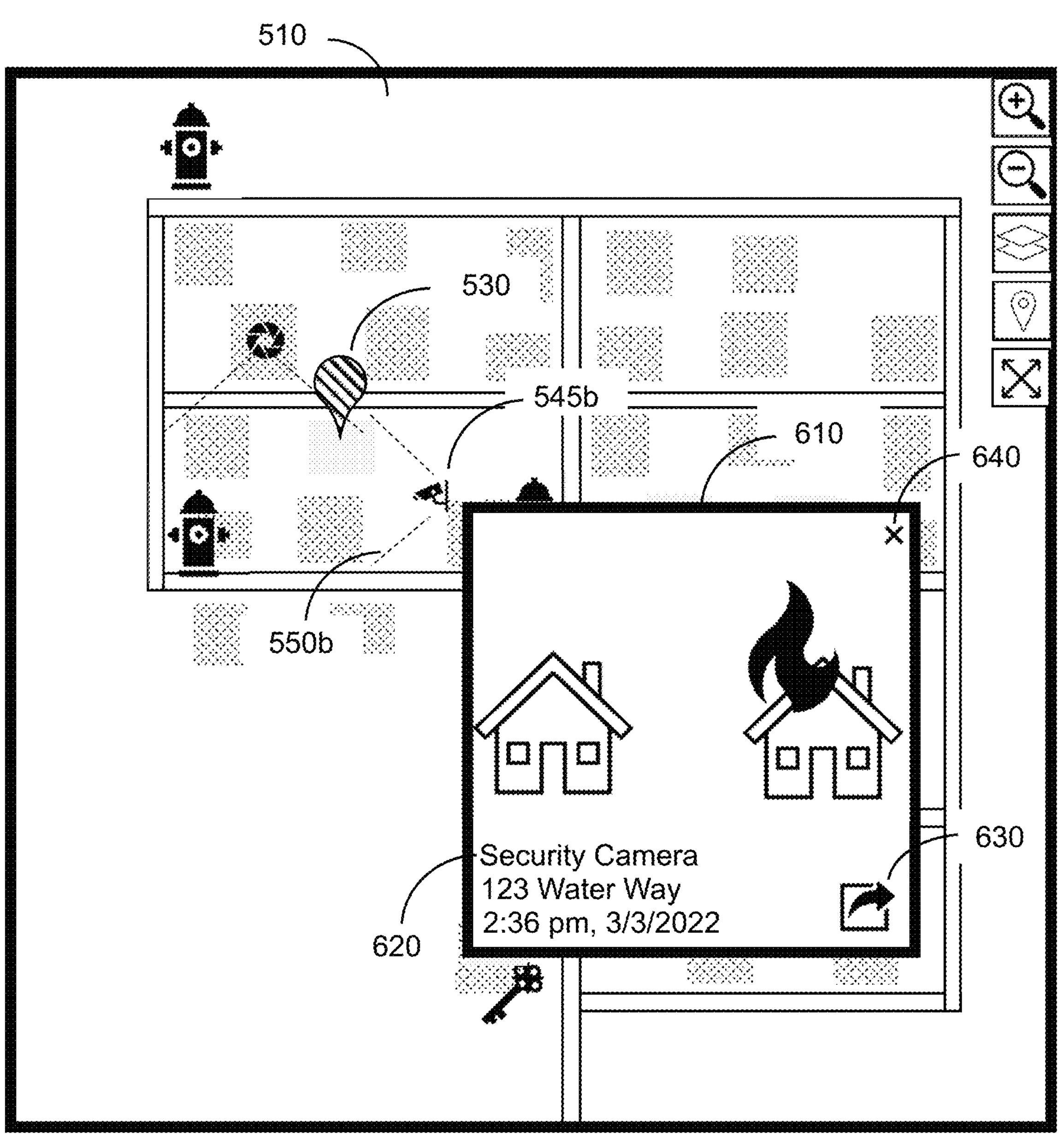
FIG. 6 illustrates the example user interface of FIG. 5 with an example camera stream in a pop-up window, according to some embodiments of the present disclosure.

The user interface server 280 provides user interfaces to users, including telecommunicators and/or first responders. As noted above, the user interface server 280 may receive incident data entered by a telecommunicator or another user. For example, an on-scene first responder may enter incident data describing the incident into a user interface, and this incident data may be used by the data engine 260 to search for additional emergency data items, or further filter the emergency data items. The user interface server 280 also provides user interfaces that include the identified emergency data items. For example, the user interface server 280 may provide a list of emergency data items and/or a map illustrating emergency data items. Certain emergency data items may be selectable, and the user interface server 280 may provide additional data via the user interface, e.g., pop-up windows or other displays. For example, a map may include an image of a camera at a particular location on a map, and a user may select the camera to view a real-time video feed of the camera. Example user interfaces provided by the user interface server 280 are shown in FIGS. 5 and 6. It should be understood that various user interface functions described herein as being performed by the user interface server 280 or by the user interface may be performed by the user interface server 280 (e.g., in a thin client implementation) or at the emergency application 148 and/or applications running on the responder devices 130 and 140 based on data and instructions provided to the devices 146, 130, and/or 140 by the user interface server 280 (e.g., in a fat client implementation).

Example Video Stream Engine

Figure 3:
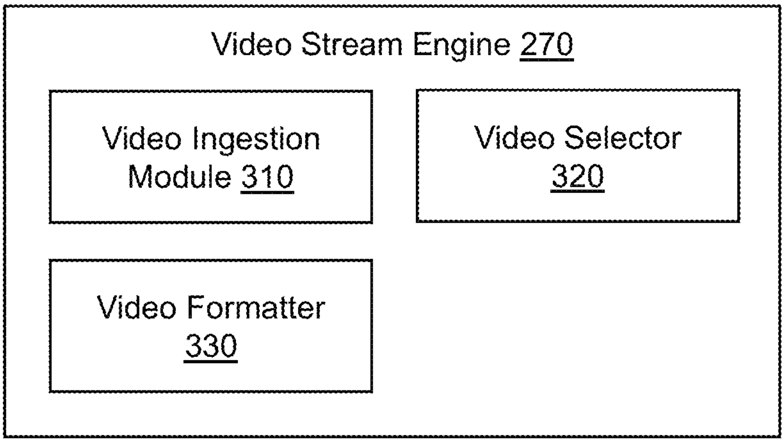
FIG. 3 is a block diagram of the video stream engine of the emergency system, according to some embodiments of the present disclosure.

FIG. 3 is a block diagram of the video stream engine 270 of the emergency system 150, according to some embodiments of the present disclosure. The video stream engine 270 includes a video ingestion module 310, a video selector 320, and a video formatter 330. In alternative configurations, different and/or additional components may be included in the video stream engine 270. Additionally, functionality described in conjunction with one or more of the components shown in FIG. 3 may be distributed among the components in a different manner than described in conjunction with FIG. 3 in some embodiments.

The video ingestion module 310 ingests videos from one or more sources. As noted above, the videos may include real-time video streams, e.g., from security cameras, body cameras, dash cameras, a video stream captured by a mobile device 110, etc. The videos may include stored video streams, such as saved videos from any of the real-time video sources, a video previously captured and sent by a mobile device 110, etc. Stored video streams may be stored locally at the local emergency data 230 and/or externally at an external video source.

The video selector 320 selects videos to provide to a user. In some embodiments, the video selector 320 selects one or more videos based on user input. For example, the data engine 260 identifies videos or video streams (referred to generally as videos) that may be relevant to an incident response (e.g., videos obtained by cameras near a location of an emergency), and the user interface server 280 provides data describing the available videos to a telecommunicator. The telecommunicator may select one or more of the videos in the user interface, and the user interface server 280 receives the selection(s). The video selector 320 selects the videos based on the selections received by the user interface server 280.

As another example, the video selector 320 may perform automated processing of one or more videos to determine whether the videos include images relevant to the incident. For example, the data engine 260 identifies potentially relevant videos (e.g., videos obtained by cameras within a particular radius of the incident, or videos taken by cameras with a field of view that includes the location of the incident). The video selector 320 may perform image analysis of each of the potentially relevant videos to determine whether the video includes relevant content. The image analysis may use artificial intelligence, e.g., one or more machine-learning modules may be trained to identify particular features, such as humans, blood, fires, car accidents, license plates, etc. As an example, if an incident involves a fire, the video selector 320 may search the contents of videos to identify any videos that include images of fire or smoke. As another example, if an incident involves a specific reported threat (e.g., a gun or a wrong-way driver) or another specific feature (e.g., a particular license plate number, a person wearing a read shirt), the video selector 320 may search the contents of videos to identify videos that include images of the threat or other physical feature. If videos include sound, the video selector 320 may also or alternatively search the sound component for specific features, e.g., the sound of a gunshot if the reported incident involves a gun or gunshot. As another example, if one video or image is known to include relevant footage (e.g., an image transmitted by an emergency caller to the emergency system 150 includes an image of a person of interest), the video selector 320 treats this video or image as reference footage, and searches for other videos that include features of the reference footage. A user may identify a particular feature in the reference footage, e.g., by selecting a portion of an image, or typing information that the video selector 320 may use to identify the feature.

The video formatter 330 formats the video or videos selected by the video selector 320 for transmission to a user. For example, if the video selector 320 selects multiple videos, the video formatter 330 may assemble the videos into a single stream, e.g., by tiling multiple videos and constructing a single video that includes multiple tiles displayed simultaneously, or by assembling multiple saved video clips sequentially. In some embodiments, the video formatter 330 watermarks videos transmitted to users, e.g., with an identifier of the user receiving the video, or an agency that the user is associated with. The watermark may be added to the video stream itself, or a video interface provided by the user interface server 280 may display a watermark over a streaming video. The watermark may discourage users from sharing a video with unauthorized users.

Example Emergency Data Items

FIG. 4 illustrates example data describing emergency data items that may be stored in the emergency data item directory, according to some embodiments of the present disclosure. FIG. 4 includes four columns of metadata for emergency data items that may be stored in the emergency data item directory 220. In this example, each data item is described by a data item type, a location, relevant emergency type(s), and permissions. The emergency data item directory 220 may include additional data, such as a unique identifier for each data item, or information for retrieving a data item (e.g., a link to a camera stream, a link to a location in the local emergency data 230 where prior incident data is stored, etc.). In some cases, different data items may have different types of metadata, e.g., some data items have links to more data while other data items (e.g., fire hydrant locations) do not, or some data items have permissions data while other data items do not.

As illustrated in FIG. 4, locations can be provided in different ways. For example, the municipal street camera has its location provided as a latitude and longitude, and the home security camera has an address. In some embodiments, the emergency data item directory 220 may store multiple location formats (e.g., both street address and latitude and longitude) so that the data engine 260 can query the emergency data item directory 220 using any of the location formats, or the emergency system 150 may use a preferred location format (e.g., latitude and longitude) throughout the system, and may convert other location formats (e.g., street addresses) to the preferred format. Certain data items, such as the police dashcam and the police bodycam, are mobile, and the emergency data item directory 220 may receive or access current locations from these devices. Alternatively, the emergency data item directory 220 may determine a location of a mobile device based on the location another device that is typically at the same location (e.g., the location of a dashcam may be inferred from telematics data of the police car). Certain data items may cover a geographic range, e.g., the keybox for the Terrace Heights community (which may be a gated community) may be described by a set of boundaries (e.g., a set of streets, or a range of latitudes and longitudes) around this community.

FIG. 4 also illustrates incident types for which different data items are relevant. Certain data items, such as public street cameras and keybox locations, are relevant to any incident type in the geographic region of these data items. Other data items are relevant for or provided for certain types of incidents, e.g., a fire hydrant data item is provided for a fire incident, and a police body cam data item is provided for a police incident. In some cases, while a particular data item may be useful for a particular incident type (e.g., the police dashcam may be relevant to a fire incident that police have responded to), the data item may not be provided for this incident for policy reasons. In some cases, a data item may be made available based on the type of response rather than and/or in addition to the type of incident, e.g., a police dashcam or police bodycam may be available for any incident that received a police response, even if the incident is not mainly a police incident type. In some embodiments, a data item may be made available for a certain sub-type of incident, e.g., a fire hydrant location may be provided for a fire response, but if a telecommunicator enters additional data indicating that the incident is a technical rescue not related to a fire, the fire hydrant data item may not be provided. Instead, the fire hydrant data item is reserved for incidents that involve active fires, or may result in active fires (e.g., car crashes or gas leaks).

FIG. 4 further illustrates permissions for the different data items. Certain data items are permitted to be viewed by any user, e.g., telecommunicators and different types of responders. Other data items are permitted to be viewed by specific users, such as particular types of responders. In some cases, data items with sensitive data or images may be permitted to be viewed by responders but not telecommunicators, which may reduce stressful information exposure for telecommunicators. In some embodiments, telecommunicators may receive some data (e.g., metadata) describing certain data items (e.g., data describing a particular video), and telecommunicators may forward the full data items to responders (e.g., so that a responder can view the video). Furthermore, some data items may be permitted to be viewed in specific use cases, e.g., an in-home security camera may be viewed if certain types of incidents are occurring within the home. Users may be able set up permissions, e.g., a user may request that in a medical event, the camera feed is not provided to responders, but that responders may view the camera in certain police events (e.g., break-ins) and/or fire events. As another example, a police agency may make police body cameras available during active police responses (e.g., when a police officer has marked himself on-scene in response to an incident) but not at other times.

Example User Interface Illustrating Data Items

FIG. 5 is an example user interface that displays relevant emergency data items, according to some embodiments of the present disclosure. The user interface includes a map 510 with various streets and building footprints. An incident indicator 520 is positioned on the map 510 at the location of an incident, e.g., the location of a mobile device 110 calling the PSAP 120 to report an emergency, or a location provided by an emergency caller and entered by a telecommunicator.

The user interface incudes a set of map options 530 that can be selected to adjust the display of the map 510, e.g., options to change the zoom level, options to change the region shown, options to change the type of data that is shown on the map 510, etc. One of the map options 530 is a layers option 535 that may open a menu or other user interface in which a user can select one or more particular layers to display on the map 510. Different layers may provide different types of data. For example, different layers may provide different incident data (e.g., all incidents being handled by the PSAP, incidents within a particular timeframe, incidents handled by a particular telecommunicator or set of telecommunicator, certain types of incidents, etc.). Other layers may provide different geographic information, e.g., street names, elevation, waterways, etc. As another example, different layers may provide different data items, e.g., one layer may show the locations of fire hydrants within the map area, another layer may show the locations of automated external defibrillators (AEDs) in the map area, another layer may show the locations of available cameras in the map area, etc.

FIG. 5 illustrates various types of data items on the map 510. As noted above, data items may be displayed based on user selection of layers. Alternatively or additionally, data items may be intelligently displayed based on the incident location, incident type, and/or other factors used by the data engine 260 to surface relevant data items. The data items shown in FIG. 5 include icons representing fire hydrants 540, cameras 545, and a keybox 555.

In this example, the incident indicated by the incident indicator 520 may be a fire incident, and the data engine 260 identified several data items that may be relevant to a user of the emergency application. For example, the data engine 260 identified the three nearest fire hydrants 540*a*-540*c* to the incident location, or the fire hydrants within a particular radius of the incident location. As another example, the data engine 260 identified two cameras 545*a* and 545*b* which have field of views 550*a* and 550*b* that include the incident location. The user interface includes dashed lines illustrating the field of views 550*a* and 550*b*. Alternatively, the data engine 260 may identify a set of cameras near the incident (e.g., within a particular radius of the incident) and display the camera icons 545 and their associated field of views 550, and a user can determine whether a camera may be useful for responding to the incident based on the illustrated camera location and field of view. In this example, the incident location may be within a gated community, and a keybox stores one or more keys for accessing the community and/or homes within the community. The data engine 260 further identified the keybox, and a keybox icon 555 is included on the map 510 at the location of the keybox.

Certain data items may be selectable. If a user selects a data item in the user interface, the user interface may provide additional details for the selected data item. For example, if a user selects the keybox icon 555, the user interface may display access information (e.g., a passcode) for the keybox, or additional details about where or how to access the keybox. As another example, if a user selects one of the camera icons 545, the user interface may display additional camera metadata and/or a real-time or previously-captured video stream from the camera.

FIG. 6 illustrates the example user interface shown in FIG. 5 with a display of an example camera stream, according to some embodiments of the present disclosure. In this example, a user has selected the camera icon 545*b*, and a pop-up window 610 displays a camera stream from the corresponding camera. For example, the user interface server 280 may receive the user selection of the camera icon 545*b* and passes the request to the data engine 260. The data engine 260 instructs the external data interface 240 to request a video stream based on data in the emergency data item directory 220. The external data interface 240 receives the video stream (e.g., from a third-party security system provider) and passes the video stream to the emergency application server 250. The video stream engine 270 may format the video. The user interface server 280 delivers the video stream to a user device, as illustrated in FIG. 6. In addition, the user interface server 280 may provide additional data 620 about the video stream in the pop-up window 610. This data may be retrieved from the emergency data item directory 220, the local emergency data 230 (e.g., locally stored information describing the camera), and/or from the external data interface 240. In this example, the additional data 620 includes camera type (security camera), camera location, and time and date that the video was captured. Alternate or additional data types may be included in the pop-up window 610.

The pop-up window 610 further includes a sharing icon 630. The user may select the sharing icon 630 to share the video with another user. For example, if a telecommunicator selects the sharing icon 630, the user interface server 680 may forward the video stream (or a link to the video stream and/or other information about the video stream) to a responder responding to the incident, e.g., to the responder device 130 and/or 140. As another example, if the telecommunicator or other user selects the sharing icon 630, the user interface may provide an additional pop-up or other user interface feature in which the user can select one or more users (e.g., a particular supervisor or a responder, or a set of responders, e.g., all fire responders) to forward the video. The pop-up window 610 also includes a close button 640 that the user can select to close the pop-up window 610.

Process for Identifying and Displaying Relevant Data Items and Video Streams

Figures 7, 8:
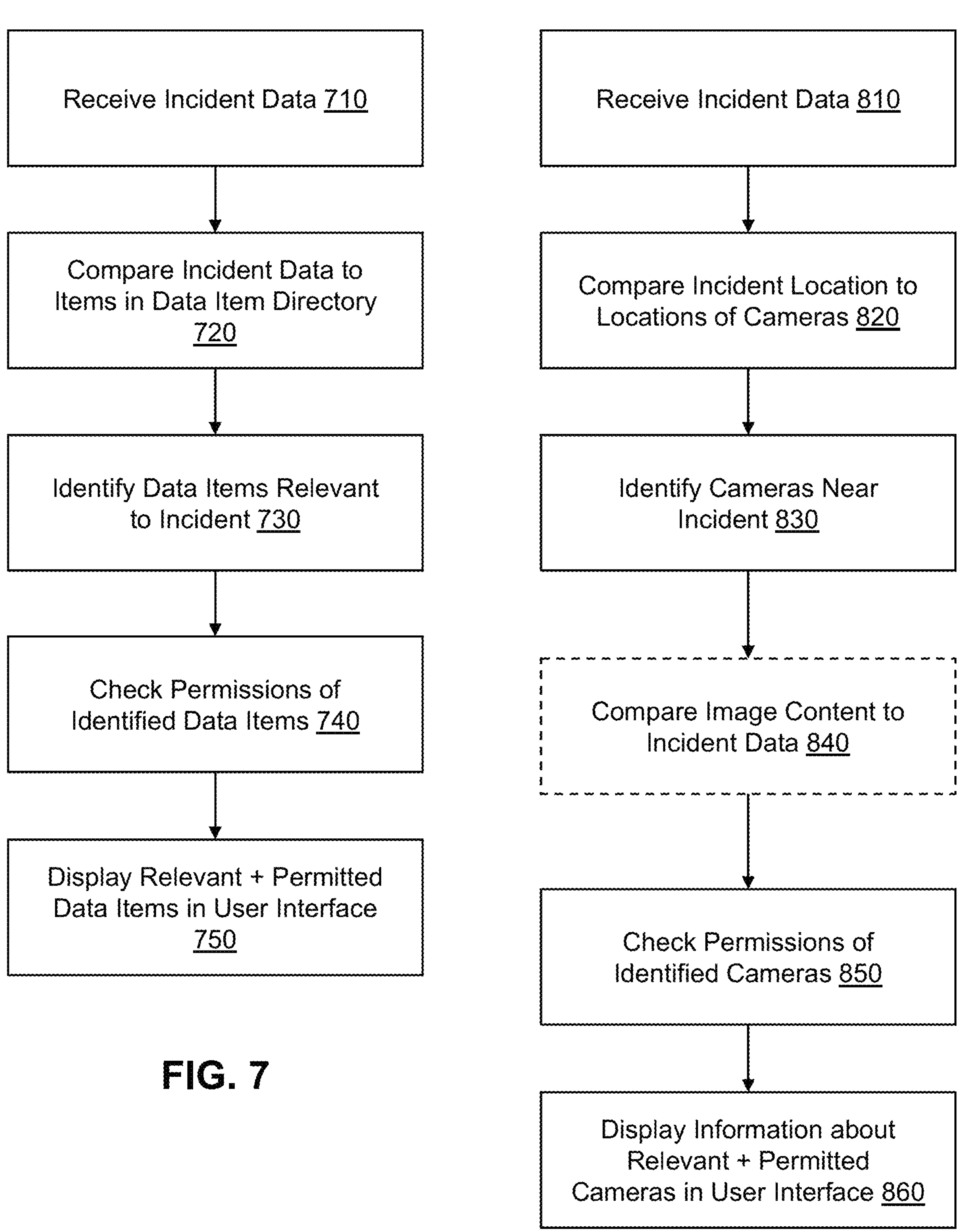
FIG. 7 is a flow diagram illustrating the identification and display of relevant data items, according to some embodiments of the present disclosure.
FIG. 8 is a flow diagram illustrating the identification and display of relevant video streams, according to some embodiments of the present disclosure.

FIG. 7 is a flow diagram illustrating the identification and display of relevant data items, according to some embodiments of the present disclosure. A computing device that provides data items to users (e.g., the emergency application server 250) receives 710 incident data. For example, the data engine 260 of the emergency application server 250 receives incident data received by the incident data ingestion module 210 and/or input by a telecommunicator and received by the user interface server 280.

The computing device compares 720 the incident data to items in a data directory. For example, the data engine 260 looks up data items in the emergency data item directory 220 using the received incident data. The incident data may include, for example, an incident location and incident type. The computing device identifies 730 data items relevant to the incident based on the comparison. For example, the data engine 260 receives data items matching the incident data from the emergency data item directory 220. The data items may include permissions data describing, for example, which users or sets or types of users are permitted to view a particular data item, or particular types or classes of incidents for which the data items may be provided.

The computing device checks 740 the permissions of the identified data items. For example, the data engine 260 compares authorized use cases of a particular identified data item to the current use case, e.g., to data describing a user requesting to view data items, or data describing the incident the user is handling. In some embodiments, the permission check is performed at the same time that the incident data is compared to items in the data directory, e.g., the data engine 260 may retrieve and identify (at processes 720 and 730) permitted data items based on permissions data in the emergency data item directory 220.

The computing device or another computing device displays 750 the relevant and permitted data items in a user interface. For example, the user interface server 280 generates and transmits a display of the relevant and permitted data items to a user device. The display may be similar to the example user interfaces shown in FIG. 5 or 6, or the display of the data items may take other forms. In some embodiments, the user interface server 280 transmits the data items to a receiving device (e.g., the telecommunicator device 126, or a responder device 130 or 140), and hardware and/or software of the receiving device generates the user interface based on the received data items.

FIG. 8 is a flow diagram illustrating the identification and display of relevant video streams, according to some embodiments of the present disclosure. A computing device that provides data items to users (e.g., the emergency application server 250) receives 810 incident data. For example, the data engine 260 of the emergency application server 250 receives incident data received by the incident data ingestion module 210 and/or input by a telecommunicator and received by the user interface server 280. The incident data includes an incident location.

The computing device compares 820 the incident location to the locations of cameras accessible by the emergency systems 150. Camera locations may be available in a data directory, e.g., the emergency data item directory 220. The data engine 260 may compare the incident location to the locations of cameras in the emergency data item directory 220. As noted above, certain camera locations, e.g., the locations of mobile cameras (e.g., dashcams or bodycams) or security system cameras, may not be stored in the emergency data item directory 220. The data engine 260 may request the external data interface 240 transmit requests to one or more external video providers for information about cameras in the area of the incident location.

The computing device identifies 730 cameras near the incident based on the comparison 720. For example, the data engine 260 receives data items describing cameras that match the incident location from the emergency data item directory 220. The data engine 260 may also receive data items describing videos from external data sources from the external data interface 240. The data items may include permissions data describing, for example, which users or sets or types of users are permitted to view a particular video, or particular types or classes of incidents for which the videos may be provided.

In some embodiments, the computing device compares 840 the image content to the incident data to determine if the image content is relevant. For example, the video stream engine 270 may perform automated image analysis to identify relevant videos based on their contents, as described with respect to FIGS. 2 and 3.

The computing device checks 850 the permissions of the identified cameras or videos, e.g., the cameras identified in process 830, or the videos identified in process 840. For example, the data engine 260 compares authorized use cases of a particular identified camera to the current use case, e.g., to data describing a user requesting to view data items, or data describing the incident the user is handling. In some embodiments, the permission check is performed at the same time that the incident data is compared to items in the data directory, e.g., the data engine 260 may retrieve and identify (at processes 820 and 830) permitted data items based on permissions data in the emergency data item directory 220.

The computing device or another computing device displays 860 information about the relevant and permitted cameras or videos in a user interface. For example, the user interface server 280 generates and transmits a display of the relevant and permitted cameras to a user device. The display may be similar to the example user interfaces shown in FIG. 5 or 6, or the display of the data items may take other forms. In some embodiments, the user interface server 280 transmits the data items to a receiving device (e.g., the telecommunicator device 126, or a responder device 130 or 140), and hardware and/or software of the receiving device generates the user interface based on the received data items. If the user interface server 280 receives a request to view a particular video, the user interface server 280 streams the video to the user device, e.g., as shown in FIG. 6.

Process for Assembling and Transmitting a Combined Video Stream

Figure 9:
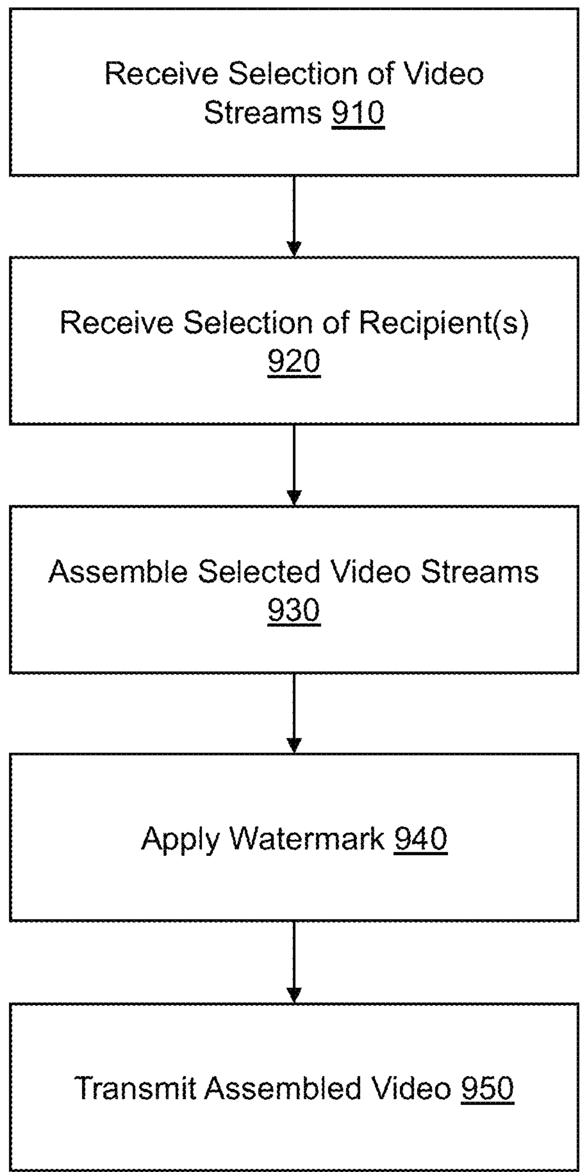
FIG. 9 is a flow diagram illustrating the assembly and transmission of a combined video stream, according to some embodiments of the present disclosure.

FIG. 9 is a flow diagram illustrating the assembly and transmission of a combined video stream, according to some embodiments of the present disclosure. As described with respect to FIG. 3, in some embodiments, a first user (e.g., a telecommunicator) may select one or more videos to send to second user (e.g., a first responder).

A computing device receives 910 a selection of one or more video streams. For example, the first user selects one or more video streams, or cameras providing such streams, in a user interface provided by the user interface server 280. In some embodiments, the first user views a video stream prior to selecting it. In some embodiments, the first user selects a video stream based on data describing the video stream (e.g., location, field of view, and camera type), without directly viewing the video. The user interface server 280 may receive the selection of the video streams or cameras.

The computing device further receives 920 a selection of one or more recipients for the selected video streams. In some embodiments, the recipients may be selected using rules, e.g., the video streams are provided to all responders responding to a particular incident, or types of responders (e.g., police responders) responding to an incident. In some embodiments, the first user may select one or more recipients or classes of recipients (e.g., responders on a particular apparatus) to receive the video stream(s).

The computing device assembles 930 the selected video streams. For example, the video formatter 330 may tile multiple videos, or combine them sequentially, as described with respect to FIG. 3. In other embodiments, the selected video streams may be sent independently. In some embodiments, the computing device 940 applies a watermark to the selected or assembled video streams, as described with respect to FIG. 3.

The computing device transmits 950 the assembled video to the selected recipient or recipients. For example, the user interface server 280 transmits the assembled video to a receiving device (e.g., a responder device 130 or 140), and hardware and/or software of the receiving device displays the assembled video.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

It should be appreciated that the electrical circuits of the accompanying drawings and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of any of the devices and systems described herein may also be implemented with respect to the methods or processes described herein and specifics in the examples may be used anywhere in one or more embodiments.

What is claimed is:

1. A method for providing situational data for incident response, the method comprising:

receiving data describing a location of an incident;

receiving data describing a type of the incident;

comparing the location of the incident and the type of the incident to a data item directory, the data item directory storing metadata describing data items, wherein at least a portion of the data items are associated with a respective location and a respective type of incident;

identifying a data item relevant to the incident based on the data item being associated with the location of the incident, and the data item being associated with the type of the incident;

displaying the identified data item in a first user interface provided to a first user assisting in a response to the incident;

receiving a request from the first user to forward the identified data item to a second user assisting in a response to the incident; and displaying the identified data item in a second user interface, the second user interface provided to the second user.

2. The method of claim 1, wherein the identified data item comprises an image from a camera located near the location of the incident, and the data item directory includes a location of the camera.

3. The method of claim 2, wherein the data item directory further includes data describing a field of view of the camera, and the location of the incident is within the field of view of the camera.

4. The method of claim 1, wherein the data item directory further includes permissions data for the identified data item, and the method further comprises:

comparing the permissions data to an access rule for the user assisting in the response to the incident; and displaying the identified data item in the user interface in response to determining that the user is permitted to access the identified data item.

5. The method of claim 1, wherein the first user interface comprises:

a map;

a first indicator displayed on the map at of the location of the incident; and a second indicator displayed on the map at the location of the identified data item, the second indicator indicating a data type of the identified data item.

6. The method of claim 5, wherein the second indicator indicates a data type of the identified data item.

7. The method of claim 1, wherein the first user is a telecommunicator, the second user is an on-scene responder, and the identified data item displayed for the second user comprises information not displayed to the first user.

8. The method of claim 7, wherein the first user is permitted to view metadata associated with the data item and the information not displayed to the first user is based on permissions of the identified data item.

9. The method of claim 1, wherein the identified data item describes a physical resource used in emergency response, and identifying a data item relevant to the incident based on the data item being associated with the location of the incident comprises identifying the data item describing the physical resource based on the location of the physical resource being within a particular radius of the location of the incident.

10. The method of claim 1, wherein the identified data item is associated with a geographical area, and identifying a data item relevant to the incident based on the data item being associated with the location of the incident comprises identifying the data item based the location of the incident being within the geographical area.

11. A system for providing situational data for incident response, the system comprising:

a data item directory, the data item directory storing metadata describing data items, a data item in the data item directory associated with a first location and a first incident type;

processing circuitry configured to:

receive data describing a second location, wherein the second location is a location of an incident, receive data describing a second incident type, wherein the second incident type is a type of the incident, and determine that the second location of the incident matches the first location of the data item and that the second incident type of the incident matches the first incident type of the data item; and a user interface server configured to display the data item in a first user interface provided to the first user assisting in a response to the incident, receive a request from a first user to forward the data item to a second user assisting in a response to the incident, and transmit the data item for display in a second user interface, the second user interface provided to the second user.

12. The system of claim 11, wherein the data item comprises an image from a camera located near the location of the incident, and the data item directory includes a location of the camera.

13. The system of claim 12, wherein the data item directory further includes data describing a field of view of the camera, and the location of the incident is within the field of view of the camera.

14. The system of claim 11, wherein the data item directory further includes permissions data for the data item, and the processing circuitry is further configured to:

compare the permissions data to an access rule for the user assisting in the response to the incident; and select the data item for display in the user interface in response to determining that the user is permitted to access the data item.

15. The system of claim 11, wherein the first user interface includes:

a map;

a first indicator displayed on the map at the location of the incident; and a second indicator displayed on the map at the location of the identified data item.

16. The system of claim 15, wherein the second indicator indicates a data type of the data item.

17. The system of claim 11, wherein the first user is a telecommunicator, the second user is an on-scene responder, and the data item displayed for the second user comprises information not displayed to the first user.

18. The system of claim 17, wherein the first user is permitted to view metadata associated with the data item and the information not displayed to the first use is based on permissions of the identified data item.

19. The system of claim 11, wherein the data item relevant to the incident describes a physical resource used in emergency response, the processing circuitry further configured to determine the second location of the incident matches the first location of the data item based on the location of the physical resource being within a particular radius of the location of the incident.

20. The system of claim 11, wherein the data item relevant to the incident is associated with a geographical area, the processing circuitry further configured to determine the second location of the incident matches the first location of the data item based on the location of the incident being within the geographical area.

* * * * *